United States Patent
Noordman et al.

(10) Patent No.: US 9,476,021 B2
(45) Date of Patent: *Oct. 25, 2016

(54) METHOD FOR THE REGENERATION OF PVPP FROM A MEMBRANE FILTER RETENTATE AFTER CLARIFICATION AND STABILIZATION OF A YEAST FERMENTED BEVERAGE

(75) Inventors: Tom Reinoud Noordman, Oegstgeest (NL); Marcel Van Der Noordt, Middelharnis (NL); Anneke Richter, Leiden (NL)

(73) Assignee: Heineken Supply Chain B.V., Zoeterwoude (NL)

( * ) Notice: Subject to any disclaimer, the term of this patent is extended or adjusted under 35 U.S.C. 154(b) by 0 days.

This patent is subject to a terminal disclaimer.

(21) Appl. No.: 13/811,215

(22) PCT Filed: Jul. 18, 2011

(86) PCT No.: PCT/NL2011/050524
§ 371 (c)(1),
(2), (4) Date: Mar. 29, 2013

(87) PCT Pub. No.: WO2012/011808
PCT Pub. Date: Jan. 26, 2012

(65) Prior Publication Data
US 2013/0196025 A1  Aug. 1, 2013

(30) Foreign Application Priority Data
Jul. 22, 2010  (EP) .................................. 10170417

(51) Int. Cl.
*C12H 1/056* (2006.01)
*B01D 41/02* (2006.01)
*B01D 15/00* (2006.01)
*B01J 20/26* (2006.01)
*B01J 20/34* (2006.01)

(52) U.S. Cl.
CPC ............. *C12H 1/0424* (2013.01); *B01D 15/00* (2013.01); *B01D 41/02* (2013.01); *B01J 20/261* (2013.01); *B01J 20/267* (2013.01); *B01J 20/3425* (2013.01); *B01J 20/3475* (2013.01)

(58) Field of Classification Search
CPC .... C12H 1/0424; C12H 1/063; C12H 1/061; C12H 1/02; C12H 1/04; C12H 1/0408; C12H 1/0416; C12H 1/22; B01D 41/02; B01D 2321/164; B01J 20/26
USPC ........ 426/330.4, 422, 330.3, 330.5, 16, 590, 426/592, 490, 495, 11; 210/691, 660, 670, 210/692, 500.41, 502.1, 651, 653, 690, 193, 210/254, 269, 500.21, 500.23, 500.27, 210/500.34, 500.35, 500.37, 500.42, 503, 210/506, 615, 635, 636, 639, 650, 654, 669, 210/741, 758, 777, 778, 792, 797, 798, 806
See application file for complete search history.

(56) References Cited

U.S. PATENT DOCUMENTS

| 5,262,053 | A  | * | 11/1993 | Meier ........................... 210/636 |
| 5,801,051 | A  |   | 9/1998  | Kiefer et al. |
| 6,117,459 | A  |   | 9/2000  | Van Den Eynde et al. |
| 2005/0279374 | A1 |   | 12/2005 | McGrath et al. |
| 2009/0291164 | A1 | * | 11/2009 | Meffert et al. .................. 426/12 |
| 2010/0062104 | A1 |   | 3/2010  | Schneid |

FOREIGN PATENT DOCUMENTS

| EP | 0 551 245 A1 | 7/1993 |
| GB | 2 288 608 A | 10/1995 |
| WO | WO 9311186 A1 * | 6/1993 |
| WO | WO-99/13048 A2 | 3/1999 |
| WO | WO-99/16531 A1 | 4/1999 |
| WO | WO-99/47636 A2 | 9/1999 |
| WO | WO-99/60090 A1 | 11/1999 |
| WO | WO-02/102960 A1 | 12/2002 |
| WO | WO-2010/052130 A2 | 5/2010 |

OTHER PUBLICATIONS

Database FSTA [Online] International Food Information Service (IFIS), Frankfurt-Main, DE; Dahmus M. et al: "PVPP-treatment and regeneration in a whirlpool. (translated) TIOL-PVPP Behandlund und Regeneration im Whirlpool.", XP002614802, Database accession No. FS-1989-12-H-0006, Abstract.
International Preliminary Report on Patentability for PCT/NL2011/050522—mailed Sep. 7, 2012.
International Preliminary Report on Patentability for PCT/NL2011/050523—mailed Jul. 16, 2012.
International Search Report for PCT/NL2011/050522—mailed Oct. 4, 2011.
International Search Report for PCT/NL2011/050523—mailed Nov. 10, 2011.
International Search Report for PCT/NL2011/050524—mailed Nov. 10, 2011.
Rehmanji, M. et al: "Beer Stabilization Technology—Clearly a Matter of Choice", Master Brewers Association of the Americas Tech Quarterly, vol. 42, No. 4, 2005, pp. 332-338, XP002614522.

* cited by examiner

*Primary Examiner* — Vera Stulii
(74) *Attorney, Agent, or Firm* — Foley & Lardner LLP; Sunit Talapatra

(57) ABSTRACT

A method of preparing a yeast fermented beverage is disclosed, comprising: (a) fermenting wort with yeast to produce a fermented liquid; (b) optionally removing the yeast; (c) mixing the fermented liquid with polyvinylpolypyrrolidone (PVPP) particles; (d) filtering the fermented liquid over a first membrane filter without employing a filter aid; (e) combining a first retentate with an aqueous regeneration liquid to desorb polyphenols and/or protein from the PVPP particles, wherein the aqueous regeneration liquid has a pH of at least 10.0; (f) filtering the combination retentate and regeneration liquid over a second membrane filter without employing a filter aid; and (g) after, optional further refining the regenerated PVPP particles from the second retentate, and recirculating the particles to step (c); wherein macromolecular components contained in the first retentate and/or retained on the second filter are degraded using a degradative agent selected from oxidants, enzymes and combinations thereof.

19 Claims, No Drawings

METHOD FOR THE REGENERATION OF PVPP FROM A MEMBRANE FILTER RETENTATE AFTER CLARIFICATION AND STABILIZATION OF A YEAST FERMENTED BEVERAGE

CROSS-REFERENCE TO RELATED APPLICATIONS

This application is a National Phase of International Application PCT/NL2011/050524, filed Jul. 18, 2011, which was published on Jan. 26, 2012, as WO 2012/011808 A1, which claims priority to European Application No. 10170417.9, filed Jul. 22, 2010, all of which are incorporated herein by reference in their entirety.

TECHNICAL FIELD OF THE INVENTION

The present invention relates to a method of stabilising yeast fermented beverages. More particularly, the present invention provides a method of stabilising yeast fermented beverages by combining a yeast fermented liquid with polyvinylpolypyrrolidone (PVPP) particles to bind at least a fraction of the polyphenols and/or the proteins contained in the fermented liquid to said PVPP particles; removing a slurry containing the PVPP particles from the fermented liquid; and regenerating the PVPP particles.

BACKGROUND OF THE INVENTION

Yeast fermented beverages, such as beer, are stabilised to ensure that the beverage tastes and looks as good at the end of its shelf life as it did after packaging. Since a consumer's first evaluation is a visual one, clarity is taken as a determining measure of beer quality. With a few notable exceptions, consumers expect a bright, appealing product, which is free from haze.

Colloidal haze in beer arises from the formation of polyphenol-protein complexes during storage. Fresh beer contains acidic proteins and a variety of polyphenols. Whilst these can form complexes via loose hydrogen bonding, their low molecular weight means that they are too small to be visible to the naked eye. As these small polyphenols, termed flavanoids, polymerise and oxidise, they produce short chain (condensed) polyphenols termed tannoids. These tannoids are capable of bridging across a number of proteins through hydrogen bonding to form reversible chill haze. After further storage, stronger ionic and covalent bonds form between the tannoids and proteins resulting in irreversible permanent haze. The rate and extent to which this occurs is impacted by the brewing materials, process and storage conditions and can be greatly improved (reduced) by the use of stabilisation aids.

Since the rate-determining factor in the development of haze is the change in the polyphenol fraction, reducing the levels of these haze precursors is a very efficient method of ensuring the colloidal stability of beer. Polyvinylpolypyrrolidone (PVPP) is a cross-linked polymer of (poly)vinylpyrrolidone that is insoluble in water. Highly porous PVPP particles are used in the brewing industry for adsorption of haze polyphenols. PVPP selectively complexes haze polyphenols, predominantly through very strong hydrogen bonding, with multiple attachment sides for haze polyphenols. The molecular structure of the PVPP polymer limits internal hydrogen bonding, maximising the number of available reactive sites.

PVPP stabilisers are either optimised for single use, where they are added to the beer stream and removed on the kieselguhr filter or, for regeneration grades, added to bright beer using dedicated filtration units and recycled for reuse. In either mode many of the initial handling characteristics are common. The PVPP powder is slurried in the dosing tank using softened de-aerated water at a concentration of around 8-12% (wt./vol.). The material must be stirred for at least 15 minutes to swell and hydrate the particles. The slurry should then be kept under constant agitation to prevent settling. In the case of regeneration grades, the stabiliser dosing tank is often maintained at 80° C. to ensure long-term microbial stability.

The most common method of adding single use PVPP is by continuous dosing to the beer stream using a proportioning pump. Although PVPP can be very effective with short contact times, a contact time of 5-10 minutes between the point of addition and removal of the spent PVPP on the kieselguhr filter is recommended for maximum efficiency. PVPP should be added to cold beer, at or below 0° C., to prevent re-dissolution of those polyphenol-protein complexes that have already formed.

The principle of regenerable PVPP use is to break the PVPP-polyphenol bonds through washing the material with a caustic (NaOH) solution. Regeneration is considered to be economic if a brewery stabilises a large output volume and/or the beer being stabilised has an extremely high polyphenol content, that would require high addition rates of PVPP for effective colloidal stabilisation. Regeneration grades of PVPP are specifically manufactured to produce particles of larger size and greater mechanical strength, which still give effective polyphenol reduction. Horizontal leaf filters were the original designs for using and regenerating PVPP, but candle filters are also now entering service.

The initial preparation of regeneration grades of PVPP is very similar to that of the single use product. A dedicated slurry tank is required, often equipped with a heating jacket. The empty filter is first purged with $CO_2$ and a pre-coat of regenerable PVPP of about 1-2 mm in depth is deposited on the filter screens of. The stabiliser slurry is recirculated around the filter till the water at the sight glass or measuring point is clear. PVPP is dosed into the now incoming beer stream using a proportioning pump. The effective stabilisation run is completed when the space between the filter plates is filled with PVPP. The final volume of beer stabilised depends on the size of the filter, PVPP charge and the addition rate into beer and can run to several thousand hl.

At the end of the filtration and stabilisation, residual beer is returned to the beer recovery tank. The used PVPP is regenerated by circulating a caustic (1-2% wt/wt) solution, at 60-80° C. through the PVPP filter bed for between 15-30 minutes. Sometimes, a second caustic rinse is used, with the first cycle run to drain and the second cycle saved for re-use as the first caustic rinse at the next regeneration. The colour of the caustic leaving the filter is very dark, confirming the breakage of the strong PVPP-polyphenol complexes. The PVPP filter cake is then flushed with hot water at 80° C. to displace the caustic solution and reduce pH. This is followed by a rinse cycle with dilute acid until the solution leaving the filter reaches around pH 4 over 20 minutes. Residues from the beer and water are effectively removed and best results are achieved by pre-heating the dilute acid to around 60° C. The filter is then flushed with cold water until the acid is washed out and the pH at the outlet is neutral. Finally $CO_2$, water and the centrifugal force of spinning the filter elements are used to displace the regenerated PVPP from the filter screens to the dosing pot. The solids (PVPP) content in the dosing tank is checked and new material added to make up for process losses. These losses are typically between 0.5-1% per regeneration. However, it is the cost of the capacious filter hardware, rather than that of the PVPP stabiliser, that has a more significant influence on the economics of PVPP regeneration.

Thus, whereas single use PVPP has the disadvantage that it generates a considerable waste stream, regenerable PVPP suffers from the drawback that it requires a considerable upfront investment in sophisticated filter hardware.

US 2009/0291164 describes a process for regenerating a PVPP-containing filter aid comprising:
 (i) providing a filter aid comprising a co-extrudate of a PVPP and a thermoplastic polymer;
 (ii) treating the filter aid with aqueous alkali;
 (iii) subsequently treating the filter aid with an enzyme; and
 (iv) subsequently thereto carrying out a second treatment with aqueous alkali.

U.S. Pat. No. 6,117,459 describes a method of regenerating a filtration adjuvant comprising synthetic polymer or natural grains, the adjuvant being charged with organic impurities which includes yeasts and which are trapped in the cavities between the adjuvant grains after filtering a liquid charged with said impurities, and being deposited on a filtration support of a filtration installation, the method including the steps of:
 washing the filtration adjuvant with a soda solution at a temperature of at least 80° C. for 60-120 minutes;
 carrying out the washing step in situ with said soda solution by passing the soda solution through the filtration installation in the washing direction identical to the direction of the liquid to be filtered;
 passing through the filtration installation in the washing direction an enzyme composition at a temperature between 40 and 60° C. for between 100 and 200 minutes, said enzyme composition including agents capable of lysing yeasts;
 washing said filtration adjuvant to eliminate therefrom the organic impurities waste product, said washing step being a second washing with a soda solution to eliminate waste products produced by the enzymatic composition passing step; and
 removing grains of the adjuvant accumulated on the filtration support to clean said filtration support and to use said grains of adjuvant for a new filtration operation.

SUMMARY OF THE INVENTION

The present inventors have developed an alternative method of stabilising yeast fermented beverages by treatment with PVPP particles and regeneration of said used PVPP-particles for re-use. The method according to the present invention can be operated with single use PVPP as well as regenerable PVPP. Furthermore, the present method is very robust and does not require sophisticated, capacious filter hardware for regenerating the PVPP.

In the method of the present invention PVPP particles are added to the yeast fermented liquid before clarification. Next, the fermented liquid containing the PVPP particles is filtered over a first membrane filter having a pore size in the range of 0.1-5 µm to produce a first retentate containing PVPP particles. Subsequently, the first rentate is combined with a regeneration liquid to desorb polyphenols and/or protein from the PVPP particles and to degrade macromolecular components contained in the retentate and the resulting liquid is filtered over a second membrane filter having a pore size in the range of 0.1-10 µm to produce a second retentate containing regenerated PVPP particles. Finally, after optional further refining of the regenerated PVPP particles, the regenerated particles are reused in the method.

More particularly, the present invention provides a method of preparing a yeast fermented beverage, said method comprising the steps of:
 a) fermenting wort with a biologically active yeast to produce a fermented liquid;
 b) optionally removing yeast from the fermented liquid (e.g by centrifugation);
 c) mixing the fermented liquid with polyvinylpolypyrrolidone (PVPP) particles, at least 80 wt. % of said PVPP particles having a diameter in the range of 5-150 µm;
 d) filtering the fermented liquid containing the PVPP particles over a first membrane filter having a pore size in the range of 0.1-5 µm without employing a filter aid to produce a clarified fermented liquid and a first retentate containing PVPP particles;
 e) combining the first retentate with an aqueous regeneration liquid to desorb polyphenols and/or protein from the PVPP particles, said aqueous regeneration liquid having a pH of at least 10.0;
 f) filtering the combination of first retentate and regeneration liquid over a second membrane filter having a pore size in the range of 0.1-10 µm without employing a filter aid to produce a second retentate containing regenerated PVPP particles; and
 g) after optional further refining of the regenerated PVPP particles contained in the second retentate, recirculating the regenerated PVPP particles to step c;
wherein macromolecular components contained in the first retentate of step d. and/or retained on the second filter of step f., are degraded using a degradative agent capable of degrading proteins and/or polyphenols, said degradative agent being selected from oxidants, enzymes and combinations thereof.

The present method offers the advantage that it enables efficient recovery of PVPP particles, including single use PVPP particles, for re-use within the same process. Secondly, the present method offers the benefit that the recycling of the PVPP particles can be carried out using the same membrane filter that is used to clarify the fermented liquid such as beer.

DETAILED DESCRIPTION OF THE INVENTION

Accordingly, the present invention relates to a method of preparing a yeast fermented beverage, said method comprising the steps of:
 a. fermenting wort with a biologically active yeast to produce a fermented liquid containing yeast, alcohol, polyphenols and protein;
 b. optionally removing yeast from the fermented liquid;
 c. mixing the fermented liquid with polyvinylpolypyrrolidone (PVPP) particles to bind at least a fraction of the polyphenols and/or the proteins contained in the fermented liquid to said PVPP particles, at least 80 wt. % of said PVPP particles having a diameter in the range of 5-150 µm;
 d. filtering the fermented liquid containing the PVPP particles over a first membrane filter having a pore size in the range of 0.1-5 µm without employing a filter aid (other than the PVPP particles) to produce a clarified fermented liquid and a first retentate containing PVPP particles;

e. combining the first retentate with an aqeuous regeneration liquid to desorb polyphenols and/or protein from the PVPP particles, said aqueous regeneration liquid having a pH of at least 10.0;
wherein the degradative agent may be added to the first retentate before, after or together with the regeneration liquid;

f. filtering the combination first retentate and regeneration liquid over a second membrane filter having a pore size in the range of 0.1-10 µm without employing a filter aid (other than the PVPP particles) to produce a second retentate containing regenerated PVPP particles; and g. after optional further refining of the regenerated PVPP particles contained in the second retentate, recirculating the regenerated PVPP particles to step c;

wherein macromolecular components contained in the first retentate of step d. and/or retained on the second filter of step f., are degraded using a degradative agent capable of degrading proteins and/or polyphenols, said degradative agent being selected from oxidants, enzymes and combinations thereof.

The term "wort" as used herein refers to the liquid extracted from the mashing process during the brewing of e.g. beer or whisky. Wort contains sugars, derived from a grain source, such as malt, that are fermented by the brewing yeast to produce alcohol, flavour etc.

The terms "clarified fermented liquid" refer to a liquid from which haze-forming components, including yeast, have been removed.

Whenever reference is made herein to the binding/desorption of polyphenols and/or the proteins to/from PVPP particles what is meant is that polyphenols or protein are bound to or desorbed from the PVPP-particles as such or as part of complexes of e.g. (polymerised) polyphenols and proteins.

The terminology "degradation of macromolecular components" refers to the breaking down of macromolecular components (e.g. components having a molecular weight in excess of 1 kDa) into smaller molecules.

The term "degradative agent" is used herein to refer to an agent that is capable of causing the break-down of the macromolecular components contained in the first retentate.

In one embodiment of the present method, no yeast is removed from the fermented liquid before it is combined with the PVPP particles. In accordance with this embodiment, the fermented liquid containing the PVPP particles typically comprises yeast in a concentration of at least 5 mg of wet yeast per kg of fermented liquid. More preferably said yeast concentration lies within a range of 10-10,000 mg of wet yeast per kg of fermented liquid, most preferably within a range of 50-10,000 mg of wet yeast per kg of fermented liquid. As will be explained in more detail below, yeast may suitably be separated from PVPP particles by a downstream treatment such as settling, flotation, separation by hydrocyclone or filtration on a small filter with larger pore size of 10-80 µm.

In an alternative embodiment of the present method yeast is removed from the fermented liquid before said liquid is combined with the PVPP particles. Yeast may suitably be removed at this stage of the method by means of hydrocyclones, settling or centrifugation, centrifugation being preferred. In accordance with this embodiment, the yeast content of the fermented liquid after the yeast removal does not exceed 50 mg of wet yeast per kg of fermented liquid, more preferably it does not exceed 5 mg of wet yeast per kg of fermented liquid. The amount of wet yeast contained in a fermented liquid may suitably be determined by a standard consistency measurement, i.e. taking a weighted amount of sample from the fermentation liquid, next centrifuge this and decant the supernatant and finally measure the weight of the centrifuged pellet.

Typically, in the present method the PVPP-particles are combined with the fermented liquid in a weight ratio of 1:100,000 to 1:100, more preferably in a weight ratio of 1:30,000 to 1:1000.

As explained herein before, the present method can be carried out using single use PVPP particles as well as regenerable PVPP particles. Typically, these PVPP particles have a mass weighted average diameter of 10-300 µm. In accordance with one embodiment of the present invention, the method employs single use PVPP particles having a mass weighted average diameter of 10-60 µm, more preferably of 12-50 µm. According to another embodiment, the present method employs regenerable PVPP particles having a mass weighted average diameter of 30-300 µm, more preferably of 40-200 µm.

The PVPP particles used in the present method preferably have a specific surface area of more than 0.1 $m^2/g$. Typically, the specific surface area of the PVPP particles lies within the range of 0.15-5 $m^2/g$.

According to another preferred embodiment, the PVPP particles employed in the present method are not a co-extrudate of PVPP and another polymer, especially not a co-extrudate of PVPP and a thermoplastic polymer.

The first retentate that is obtained by filtering the fermentation liquid containing the added PVPP particles preferably contains at least 0.1 g/l, more preferably 1-200 g/l of said PVPP particles.

It is further preferred that at least 95 wt. % of the wetted PVPP particles contained in the first retentate have a density of less than 1.2 g/ml, preferably of 1.0-1.1 g/ml.

The combining of the first retentate with the aqueous regeneration liquid may suitably be achieved by rinsing the first retentate with said regeneration liquid while the first retentate is in direct contact with the first membrane filter, and removing the liquid containing desorbed and degraded components through the filter.

In accordance with a particularly preferred embodiment of the present invention, the first membrane filter is also employed as the second membrane filter in step e. Thus, the use of an additional filtration unit may be avoided.

The desorption/regeneration step e. and the filtration step f. may be carried out concurrently or consecutively, each option having its own advantages and disadvantages. In an embodiment, step e. comprises transferring the first retentate to a mixing vessel where it is mixed with the regeneration liquid. This offers the advantage that, if the second membrane filter is the same filter as the first membrane filter, said membrane filter can be used for filtering another batch of fermented liquid containing PVPP particles whilst the first retentate produced in the previous batch is being regenerated in the mixing vessel. Thus, the first membrane filter can be employed in a very efficient way. In addition, this embodiment offers the advantage that the regeneration of PVPP particles contained in the first retentate can be maximized by employing optimum regeneration conditions in the mixing vessel, e.g. by continuously stirring the contents of the vessel and/or by heating said contents (e.g. to temperatures up to 80° C.).

The first membrane filter that is used in the present method preferably has a pore-size of at least 0.2 µm. The pore-size of said membrane filter preferably does not exceed 2 μm, most preferably it does not exceed 1 μm.

In the present method, the combination of first retentate and regeneration liquid that is filtered over the second membrane filter preferably has a solids content up to 300 g/l, more preferably of 1-200 g/l and most preferably of 10-200 g/l.

The present method offers the advantage that the PVPP particles can be recovered in the second retentate in very high yields. A yield of 80 wt. % is easily achieved, and even yields of 95 wt. % or more are feasible.

An essential element of the regeneration of the PVPP particles is the desorption of the polyphenols and/or proteins that are bound to the PVPP particles. Preferably, the polyphenols and/or proteins are desorbed from the PVPP particles by employing a regeneration liquid having a pH of at least 11.0.

In accordance with the present invention, macromolecular components contained in the first retentate and/or desorbed from the PVPP particles, part of which may be retained by the second membrane filter, are degraded to prevent or reverse clogging of said second membrane filter and to avoid pressure build-up. To this end, a degradative agent capable of degrading polyphenols and/or proteins is employed, said degradative agent being selected from oxidants, enzymes and combinations thereof. In one embodiment of the invention, the regeneration liquid contains the degradative agent. In an alternative embodiment, the degradative agent may be contained in a separate composition, typically an aqueous liquid, which may be added to the first retentate, either before, after or together with the regeneration liquid. In yet another embodiment, an aqueous liquid containing the degradative agent is used to rinse the second filter following step f.

In accordance with a preferred embodiment, the degradative agent comprises an oxidant. The oxidant is typically employed in an aqueous liquid, preferably the regeneration liquid, at a concentration of at least 0.1 g/l, more preferably of at least 0.5 g/l and most preferably of at least 1 g/l. Preferred oxidants include persulfates, hypohalites, peroxides and combinations thereof.

In accordance with an alternative embodiment, the degradative agent is an enzyme, preferably an enzyme selected from proteinases, carbohydrate degrading enzymes (e.g. glucanases), polyphenol oxidases and combinations thereof. The filtering of the fermented liquid and the subsequent regeneration of the PVPP particles are suitably completed within 2 hours. More preferably, these procedures are completed in 0.2-1 hours.

In an embodiment that is particularly advantageous the first membrane filter of step d. is employed as the second membrane filter in step f. and the regeneration liquid employed in step e. comprises the degradative agent.

The second retentate is advantageously rinsed with an acid aqueous liquid, followed by rinsing with water, before recirculating the regenerated PVPP-particles to step b. These rinsing actions are advantageously performed by passing the rinsing liquids through the second retentate while it is in contact with the second membrane filter, and removing the rinsing liquids through the filter.

In order to remove residual yeast that is contained in the first retentate, especially if no yeast is removed prior to the combining of the fermented liquid with the PVPP particles, it is advantageous to reduce the yeast content of the first retentate prior to or after the combining of the first retentate with the aqueous regeneration liquid by subjecting said first retentate or the combination of first retentate and the aqueous regeneration liquid to sedimentation separation.

In an alternative embodiment that is particularly advantageous in case the first membrane filter and the second membrane filter are the same, residual yeast is removed from the second retentate prior to recirculation. Accordingly, it is preferred that the second retentate is further refined prior to recirculation of the regenerated PVPP particles by removing yeast from said second retentate by means of sedimentation separation.

The terminology "sedimentation separation" as used herein refers to a separation technique in which solid particles that are suspended in a liquid are separated on the basis of a difference in density. Sedimentation is the tendency for particles in suspension to settle out of the fluid in which they are entrained in response to gravity and/or centrifugal acceleration.

Examples of sedimentation separation techniques that may be employed to remove yeast include settling, flotation and separation in hydrocyclones; flotation and separation by hydrocyclones being preferred. Most preferably, the present method employs flotation to separate the residual yeast from the PVPP particles contained in the second retentate. The term settling is used to refer to separation in which only gravitation force is used to perform the separation.

Flotation of particles is governed by the same force balances as settling. Flotation can be used for solids classification when there is a mixture of particles of different density in suspension. The inventors have found that flotation can advantageously be used to separate PVPP particles from yeast cells as the sedimentation velocity of yeast cells tends to be significantly higher than that of PVPP particles.

Hence, in accordance with a particularly preferred embodiment, the removal of yeast from the first retentate or the second retentate preferably comprises passing a liquid comprising said retentate through a separation vessel in an upward laminar flow and by separately removing a yeast enriched fraction and a PVPP enriched fraction, said PVPP enriched fraction being removed downstream (and above) of where the yeast enriched fraction is removed. It will be understood that the term "separation vessel" as used herein should not be construed narrowly as the vessel may suitably take the shape of, for instance, a standing tube.

In order to achieve effective separation of PVPP particles and yeast cells, it is preferred to pass the liquid containing the second retentate through the separation vessel at a vertical flow rate of 0.01-10 mm/s, more preferably of 0.04-3 mm/s.

Hydrocyclones may also suitably be used to separate the residual yeast from the PVPP particles contained in the second retentate. A hydrocyclone is a device to classify, separate or sort particles in a liquid suspension based on the densities of the particles. Hydrocyclones normally have a cylindrical section at the top where liquid is being fed tangentially, and a conical base. A hydrocyclone has two exits on the axis: the smaller on the bottom (underflow or reject) and a larger at the top (overflow or accept). The underflow is generally the denser or thicker fraction, while the overflow is the lighter or more fluid fraction.

In the present method the PVPP-enriched fraction that is produced by sedimentation separation of the first retentate is subsequently filtered over the second membrane filter. The PVPP-enriched fraction that is obtained by sedimentation separation of the second retentate is recirculated to step b.

The sedimentation separation employed in the present method preferably yields a PVPP-enriched fraction in which the weight ratio of PVPP particles to yeast is substantially higher than the same weight ratio in the yeast-enriched fraction. Accordingly, in a preferred embodiment the weight ratio of PVPP particles to yeast of the PVPP-enriched fraction is at least 3 times, more preferably at least 5 times higher than the same weight ratio of the yeast-enriched fraction.

Likewise, the yeast concentration of the yeast-enriched fraction is at least 3 times, preferably at least 5 times higher than the same concentration in the PVPP-enriched fraction.

The present method may be carried out as a batch process, a semi-continuous process or a continuous process. Preferably, the process is carried out as batch process.

The invention is further illustrated by means of the following non-limiting examples.

EXAMPLES

A freshly prepared slurry of single use grade PVPP particles (Polyclar® 10, as supplied by ISP) was dosed into Heineken® unstabilised beer prior to membrane filtration (pore size 0.5 μm). After 3 hours of filtration at 8 hl/hr on the membrane filter (with a filter area of 10 m2), the slurry in the retentate was rinsed with water to remove the beer.

Subsequently, the retentate was rinsed with a 2% NaOH solution, combined with 0.2% Sodium hypochlorite as oxidising agent, at a temperature of 40° C. for 20 min, to regenerate the PVPP. When the filtrate became clear, the PVPP containing retentate was rinsed with water, acid and water steps. Next beer filtration was resumed and pressure build up in time was followed. The test was repeated with 0.5% Sodium Persulphate instead of Sodium hypochlorite as oxidizing agent and regenerable PVPP (Divergan® RS, as supplied by BASF) instead of single use grade (Polyclar® 10).

Table 1 shows the start up pressures (ΔP) and pressure built up in time (dΔP/dt) during filtration of beer before and after the regeneration of PVPP took place on the membrane filter. Results show that when PVPP is regenerated with only caustic, the pressure built up in time and the start up pressure of the next filtration is much higher than when oxidisers are used (hypochlorite in combination with Polyclar® 10, persulphate in combination with Divergan® RS). This can be explained by the fact that the debris that was desorbed from the PVPP blocked the membrane filter. Using the oxidising agents together with the caustic regeneration minimises such fouling of membrane filters.

TABLE 1

Pressure build up during filtration of beer on a membrane filter before and after a regeneration step on PVPP executed on the same filter Test on regeneration of Polyclar ® 10 with only 2% caustic

| | Start time (hr:min) | $\Delta P_{start}$ (bar) | End time (hr:min) | $\Delta P_{end}$ (bar) | dΔP/dt (bar/hr) |
|---|---|---|---|---|---|
| Before regeneration | 0:00 | 0.290 | 3:13 | 0.82 | 0.16 |
| After regeneration | 0:00 | 0.737 | 0:40 | 1.02 | 0.42 |

Test on regeneration of Polyclar ® 10 with 2% caustic and 0.2% Sodium hypochlorite

| | Start time (hr:min) | ΔP (bar) | End time (hr:min) | ΔP (bar) | dΔP/dt (bar/hr) |
|---|---|---|---|---|---|
| Before regeneration | 0:00 | 0.229 | 3:19 | 0.423 | 0.06 |
| After regeneration | 0:00 | 0.269 | 1:29 | 0.504 | 0.16 |

TABLE 1-continued

Pressure build up during filtration of beer on a membrane filter before and after a regeneration step on PVPP executed on the same filter Test on regeneration of Divergan ® RS with 2% caustic and 0.5% sodium persulphate

| | Start time (hr:min) | ΔP (bar) | End time (hr:min) | ΔP (bar) | dΔP/dt (bar/hr) |
|---|---|---|---|---|---|
| Before regeneration | 0:00 | 0.310 | 2:42 | 0.420 | 0.04 |
| After regeneration | 0:00 | 0.369 | 0:59 | 0.456 | 0.09 |

Samples of fresh, unused PVPP slurry, and the retentate containing PVPP after the regeneration were taken to measure adsorption capacity. Fresh, unused single use grade PVPP (Polyclar® 10) had an adsorption capacity of 63.8%, as measured by a standard analysis in which a catechin solution is contacted with a defined quantity of PVPP and the reduction of catechin in this solution is taken as measure for the adsorption capacity. The PVPP as regenerated by the procedure as described above with sodium hypochlorite had an adsorption capacity of 58.9%. Adsorption capacity of used PVPP was about 5-8%.

With regenerable grade PVPP (Divergan® RS), the adsorption capacities of fresh PVPP and PVPP that was regenerated with sodium persulphate were 44.4 and 42.4% respectively. Adsorption capacity of the used PVPP was 14%.

The invention claimed is:

1. A method of regenerating polyvinylpolypyrrolidone (PVPP) particles in preparing a yeast fermented beverage, comprising:
    (a) fermenting wort with a biologically active yeast to produce a fermented liquid containing yeast, alcohol, polyphenols and protein;
    (b) optionally removing yeast from the fermented liquid;
    (c) mixing the fermented liquid with single use grade PVPP particles to bind at least a fraction of the polyphenols and/or the proteins contained in the fermented liquid to the PVPP particles, wherein at least 80 wt. % of the PVPP particles have a diameter of 5-150 μm;
    (d) filtering the fermented liquid containing the PVPP particles over a first membrane filter having a pore size of 0.1-5 μm without employing a filter aid to produce a clarified fermented liquid and a first retentate containing PVPP particles;
    (e) combining the first retentate with an aqueous regeneration liquid to desorb polyphenols and/or protein from the PVPP particles, the aqueous regeneration liquid having a pH of at least 10.0;
    (f) filtering the combination of first retentate and regeneration liquid over a second membrane filter having a pore size in the range of 0.1-10 μm without employing a filter aid to produce a second retentate containing regenerated PVPP particles; and
    (g) optionally further refining the regenerated PVPP particles contained in the second retentate, and recirculating the regenerated PVPP particles to step (c);
    wherein macromolecular components contained in the first retentate of step (d) and/or retained on the second filter of step (f) are degraded using an oxidant.

2. The method according to claim 1, wherein the first membrane filter of step (d) is employed as the second membrane filter in step (f).

3. The method according to claim 2, wherein steps (e) and (f) are carried out concurrently.

4. The method according to claim 1, wherein steps (e) and (f) are carried out consecutively.

5. The method according to claim 4, wherein step (e) comprises transferring the first retentate to a mixing vessel where it is mixed with the regeneration liquid.

6. The method according to claim 1, wherein the first membrane filter has a pore-size of 0.2-1 µm.

7. The method according to claim 1, wherein at least 80 wt. % of the PVPP particles employed in the method is recovered in the second retentate.

8. The method according to claim 7, wherein at least 95 wt. % of the PVPP particles employed in the method is recovered in the second retentate.

9. The method according to claim 1, wherein step (e) comprises combining the first retentate with the oxidant.

10. The method according to claim 9, wherein the degradative agent is contained in the regeneration liquid.

11. The method according to claim 1, wherein the oxidant is selected from persulfates, hypohalites, peroxides and combinations thereof.

12. The method according to claim 1, wherein the combining of the fermented liquid and the PVPP particles is achieved by mixing the fermented liquid with the PVPP particles.

13. The method according to claim 1, wherein the PVPP-particles are combined with the fermented liquid in a weight ratio of 1:100,000 to 1:100.

14. The method according to claim 13, wherein the PVPP-particles are combined with the fermented liquid in a weight ratio of 1:30,000 to 1:1000.

15. The method according to claim 1, wherein the first retentate contains at least 0.5 g/l of the PVPP particles.

16. The method according to claim 15, wherein the first retentate contains 1-200 g/l of the PVPP particles.

17. The method according to claim 1, wherein yeast is removed from the first retentate prior to or after the combining of the first retentate with the aqueous regeneration liquid by subjecting the first retentate or the combination of first retentate and the aqueous regeneration liquid to sedimentation separation.

18. The method according to claim 1, wherein the second retentate is further refined prior to recirculation of the regenerated PVPP particles by removing yeast from the second retentate by means of sedimentation separation.

19. The method according to claim 17, wherein the sedimentation separation technique employed is selected from flotation separation and separation by means of a hydrocyclone.

* * * * *